INVENTOR.
PIETER F. HOOS
ATTORNEY

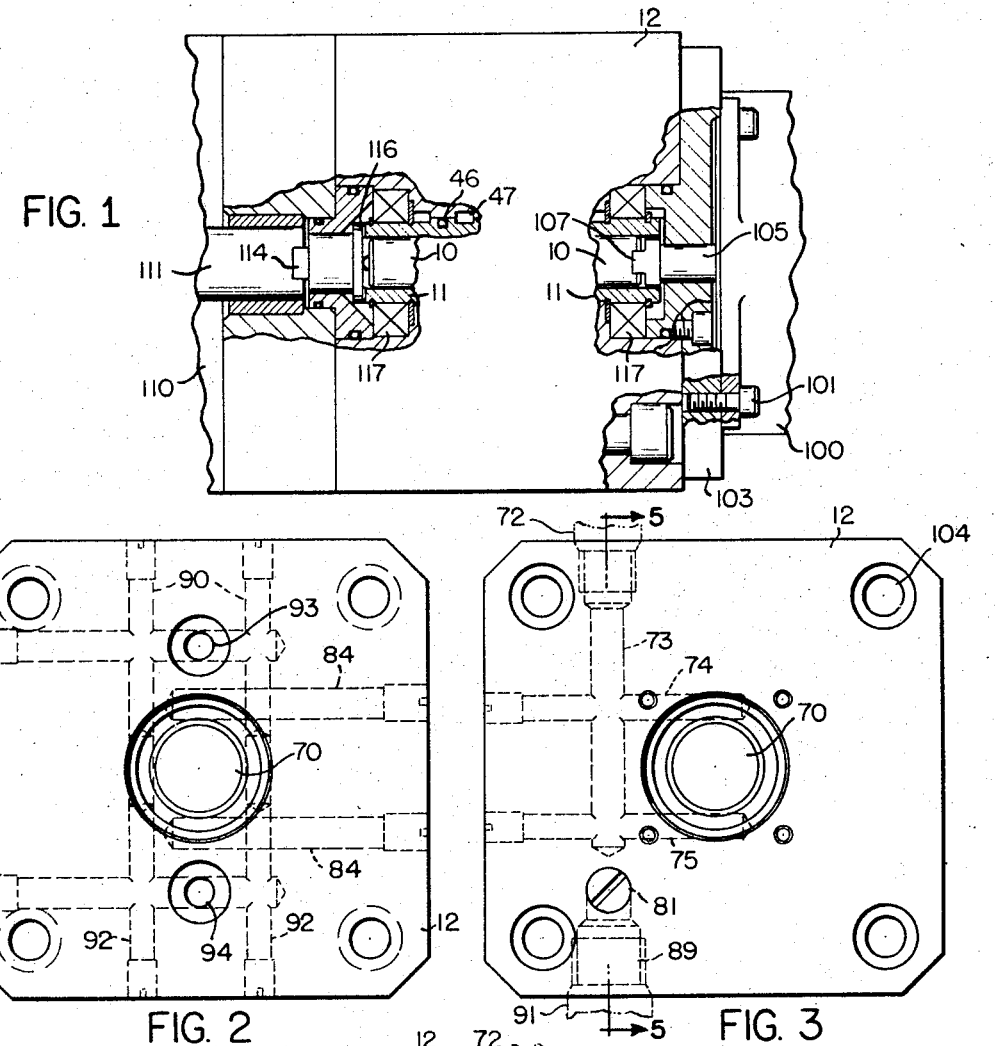
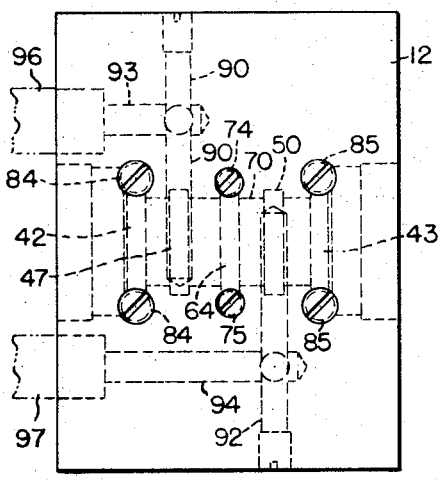
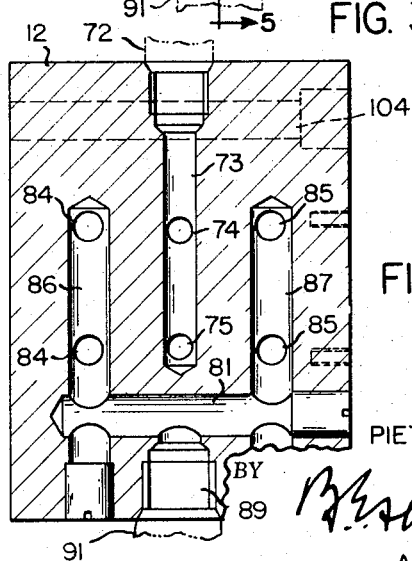

INVENTOR.
PIETER F. HOOS
BY
ATTORNEY

United States Patent Office 3,454,049
Patented July 8, 1969

1

3,454,049
ROTARY SERVO VALVE
Pieter F. Hoos, Webster, N.Y., assignor to H-M Industries, Inc., Rochester, N.Y., a corporation of New York
Filed Apr. 10, 1967, Ser. No. 629,564
Int. Cl. F16k 31/12, 31/36, 5/04
U.S. Cl. 137—625.65                           7 Claims

ABSTRACT OF THE DISCLOSURE

This valve comprises a rotary spool, a rotary sleeve which surrounds the spool and in which the valve rotates, and a housing in which the sleeve is rotatably mounted. The housing has radial ports. Axially overlapping ports are provided in the spool; and the sleeve provides access to the axial ports in the spool through openings which are spaced axially to correspond with the radial ports in the housing. In different positions of rotation of the spool, and sleeve, the pressure fluid is directed to opposite ends of the piston or whatever it is that is controlled by the valve. A pin limits relative rotation of spool and sleeve.

---

Either reciprocable, oscillatable, or rotary valves may be employed to control the directions of movement of reciprocable, oscillatable, or rotatable hydraulically or pneumatically operated parts. The conventional reciprocable spool valve comprises a spool with three or five axially spaced lands. The spool is mounted in a housing which is stationary, or contains a stationary sleeve. The pressure fluid is admitted to the spool through a port or ports in the sleeve which are disposed midway the length of the spool. Disposed, respectively, at opposite sides axially of this port or ports, are two ports which communicate, respectively, with opposite ends of the cylinder which contains the piston whose movement is controlled by the valve. Spaced still further axially away from the central port or ports are the two exhaust ports which carry the return fluid back to the pump or sump.

A rotary valve may have longitudinal grooves in its periphery of a length to cover, when in registry therewith, two axially-spaced ports in the housing as the valve rotates. Different grooves are spaced angularly from one another about the axis of the valve so that in different positions of rotation of the valve the pressure port in the housing will be connected to one of the two opposite sides, respectively, of the part whose operation the valve controls and the other side of the part will be on exhaust.

One object of the present invention is to provide a rotary control valve constructed so that radial unbalancing forces as well as axial unbalancing forces are eliminated.

Another object of the invention is to provide a rotary control valve which is easier to operate and which is more precise in its control than prior types of such valves.

A further object of the invention is to provide a rotary control valve which may be coupled to a hydraulic motor in such fashion that while the motor has driving connection to the valve, the valve will control the motor itself in a direct timed relation.

In these drawings:

FIG. 1 is a side elevation with parts broken away, showing the housing, sleeve and spool of a valve constructed according to one embodiment of this invention, and showing also how the spool and sleeve are connected to the drive motors therefor;

FIG. 2 is an end view of the housing, looking at one end thereof;

FIG. 3 is a view of the other end of the housing;

FIG. 4 is a plan view of the housing;

2

Figure 6:
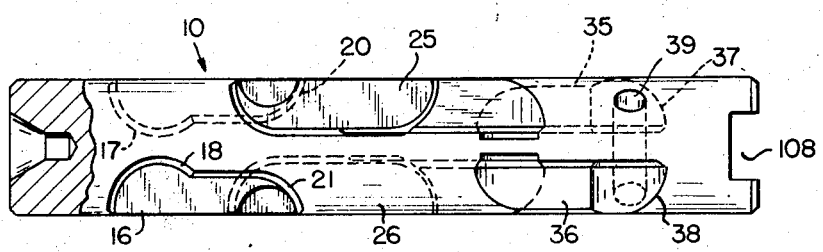
Figure 7:
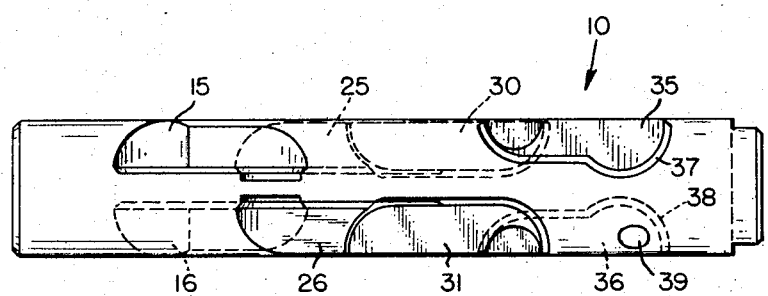
Figure 8:
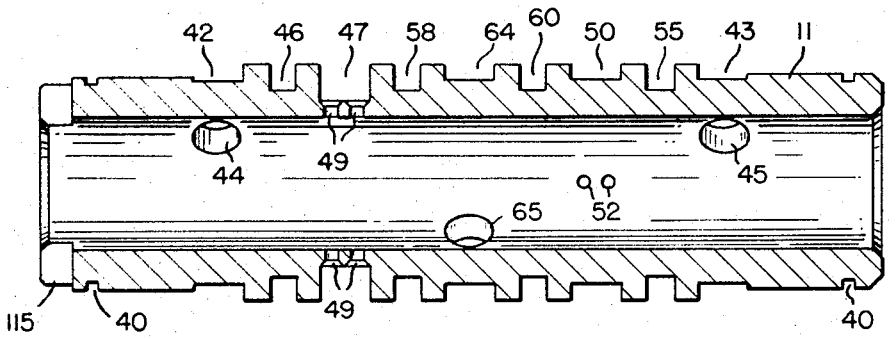
Figure 9:
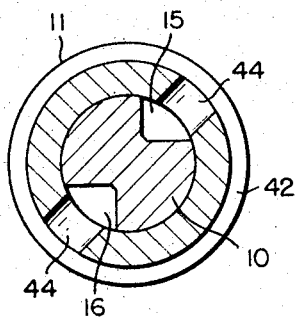

FIG. 5 is a section through the housing taken on the line 5—5 of FIG. 3 looking in the direction of the arrows;

FIG. 6 is an enlarged elevational view of the spool, partly broken away;

FIG. 7 is also an enlarged elevational view of the spool but taken at right angles to the view of FIG. 6;

FIG. 8 is an enlarged axial section through the sleeve; and

FIGS. 9, 10, 11, 12 and 13 are, respectively, transverse sectional views of the assembled spool and sleeve and taken, respectively, in parallel planes perpendicular to the common axis of spool and sleeve.

Referring now to the embodiment of the invention illustrated in the drawings, 10 denotes the valve spool, 11 the sleeve, in which the spool is rotatable, and 12 the housing in which the sleeve is rotatable.

Adjacent one end, the spool has two diametrically opposed, longitudinally-extending recesses 15 and 16 (FIGS. 6, 7 and 9) in it, which are of irregular shape, and which have inside walls of longitudinally varying depth. These walls have portions 17 and 18, respectively, curved on radii of large diameter at one end, and portions 20 and 21, respectively, curved on radii of smaller diameter at the other end, so that the recesses are deep at one end and relatively shallow at the other end, as shown in FIGS. 6 and 7.

Figure 11:
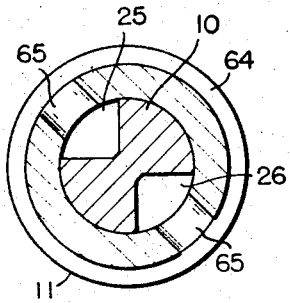
Figure 12:
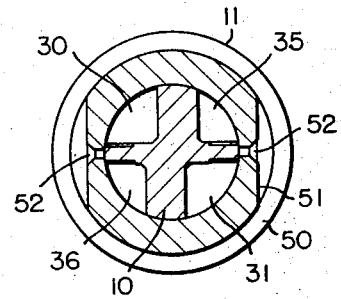

The spool is provided also with diametrally opposed grooves 25 and 26 (FIGS. 6, 7 and 11). These grooves overlap the grooves 15 and 16 axially of the spool, but not angularly; they are staggered at an angle of approximately 90° each with reference to the grooves 15 and 16, respectively, about the axis of the spool. The grooves 25 and 26 are of uniform depth for the major portions of their lengths, but run out to the periphery of the spool at their ends, as shown in FIGS. 6 and 7.

The spool is provided too with two diametrally opposed grooves or recesses 30 and 31 (FIGS. 6, 7 and 12), which are of uniform depth for the major portions of their lengths but run out to the periphery of the spool at their ends, as shown in FIGS. 6 and 7. The recesses 30, 31 overlap axially the recesses 25 and 26, and communicate with these recesses at one end.

Two additional diametrically opposed grooves or recesses 35 and 36 (FIGS. 6, 7, 12 and 13) are provided in the spool. These overlap the grooves 30 and 31 axially of the spool, but are displaced angularly about the axis of the spool approximately 90° from the grooves 30 and 31. The grooves 35 and 36 are irregularly shaped like the grooves 15 and 16, but are reversed with reference to the grooves 15 and 16, that is, their larger radial portions 37, 38, respectively, are adjacent the opposite end of the spool from the portions 17 and 18 of the grooves 15 and 16.

Figure 13:
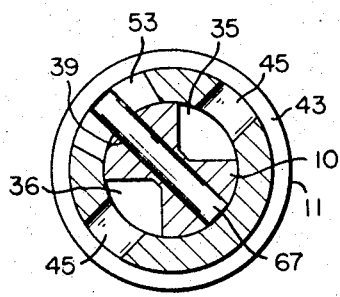

A hole or duct 39 (FIGS. 6, 7 and 13) extends diametrally through the spool in equiangularly spaced relation to the pockets 35 and 36 as shown in FIG. 13.

The sleeve 11 has two peripheral grooves 40 adjacent its opposite ends, respectively, which contain spring snap rings of conventional construction for holding in place the inner races of the anti-friction bearings by means of which the sleeve 11 is rotatably mounted in the housing 12.

Spaced from one another longitudinally along the sleeve 11 between grooves 40 are other peripheral grooves 42, 46, 47, 58, 64, 60, 50, 55 and 43. The grooves 42 and 43 (FIG. 8) have, respectively, walls of shallow depth at one side, and walls of greater depth at their opposite sides. Two diametrally opposite radial ports 44 (FIGS. 8 and 9) communicate with the groove 42 and two diametrally opposite radial ports 45 (FIGS. 8 and 13) communicate with the groove 43. The sleeve is slabbed off at groove 47 at diametrally opposite portions as indicated at 48 in FIGS.

8 and 10; and two diametrally opposite pairs of radial ports 49 communicate with this groove. Similarly, there is a peripheral groove 50 in the sleeve, opposite sides of which are slabbed off as denoted at 51 (FIG. 12); and two diametrally opposite pairs of ports 52 connect this groove 51 with the bore of sleeve 11. The slabbed off portions or secondary grooves, denoted at 48 and 51, are spaced 90° apart about the axis of the sleeve. In addition, there is a slot 53 (FIG. 13) in sleeve 11 communicating with groove 43. This slot 53 is of greater angular extent than the ports 45 and is disposed midway between the two ports 45.

The groove 64 is connected by diametrically opposite radial ports 65 with the bore of the sleeve.

A pin 67 (FIG. 13), which is mounted in the hole 39 in the spool, engages at one end in the slot 53 (FIG. 13) in the sleeve. This slot has greater arcuate length than the diameter of the pin so that the pin permits limited movement of the spool relative to the sleeve. This prevents permanent phase shift between the input and feedback signals to the valve.

The grooves 46, 58, 60 and 55 hold conventional O-rings, which act as seals to prevent leakage of the pressure fluid along the length of the sleeve. Instead of placing such grooves in the sleeve, however, these grooves may be provided in the bore of the housing to contain the O-rings.

The pressure fluid flows through the groove 64 and the ports 65 into the grooves 25 and 26 of the spool or the grooves 30 and 31 depending upon the positions of the spool and sleeve relative to the housing, as will appear hereinafter.

The grooves 47 and 50 (FIGS. 10 and 12) in the sleeve communicate with the restricted ports 49 and 52, respectively, to provide torque compensation between the spool and sleeve of the Bernoulli forces which tend to open the valve; the cavities 15, 16, 35 and 36 (FIGS. 6 and 7) are shaped as shown, to create a controlled vortex with the radial forces counterbalancing the Bernoulli forces created in the cavities 25, 26, 30 and 31 (FIGS. 6 and 7).

The housing 12 has a central bore 70 in which the sleeve is mounted. The pressure fluid is supplied to this bore through tubing 72 (FIG. 3) which is connected with the duct 73 in the housing, which in turn is connected with the cross ducts 74 and 75 that lead to the groove 64 (FIG. 8) in the sleeve which is adapted to communicate through the ports 65 with the grooves 30 and 31 (FIG. 12) in the spool 10. The exhaust fluid is adapted to flow through the ports 44 and 45 (FIG. 8) adjacent opposite ends, respectively, of the sleeve 11, into the grooves 42 and 43, respectively, in the sleeve and into the ducts 84 and 85, respectively. Ducts 84 communicate with a duct 86; and ducts 85 communicate through a duct 87 with a horizontal duct 81 which in turn communicates with the duct 86. Duct 81 communicates through the duct 89 and hose 91 with the sump. The outer ends of ducts 86, 87, 81, 74, 75 are closed by plugs.

The ducts 90, 92, which carry the motive fluid to and from opposite ends, respectively, of the valve, are connected through ducts 93 and 94, respectively, with conductors 96 and 97, respectively, which, in turn, are connected with opposite ends of the actuator in which the moving member, that is to be controlled, reciprocates, oscillates, or rotates.

In the embodiment illustrated, the spool 10 is driven by a synchronous motor 100 (FIG. 1) which is secured by screws or bolts 101 to the end of flange 103 of the housing 12. This end flange is secured to the housing in turn by bolts or screws 104 (FIG. 3). The shaft 105 of the motor 100 is coupled by a conventional coupling to the spool 10. A projection 107 (FIG. 1) on the coupling engages in an end slot 108 (FIG. 6) in one end of the spool.

The sleeve 11 is driven from the actuator output shaft 111 of motor 110 (FIG. 1) through a conventional coupling member 114, which engages at one end in a diametral groove in the confronting end of the shaft 111, and at its opposite end in the slot 116 in sleeve 11.

The sleeve is mounted in the housing on roll or ball bearings 117.

One unique feature of the construction illustrated is that while the hydraulic motor 110 drives the sleeve 11 of the valve, the valve spool controls the position of the hydraulic motor, since the hydraulic motor is connected through a supply line 72 to the valve housing, and is connected through return line 91 to the housing. The motor feed back into the valve sleeve differentiates the integrating action of the valve spool, making it, in effect, a linear device.

In operation, the pressure fluid is supplied to the valve from line 72 (FIG. 3) through ducts 73, 74 and 75 in the housing 12, groove 64 (FIGS. 8 and 11) and ports 65 in the sleeve 11, and ducts 25 and 26 in the spool. The direction of flow of the pressure fluid from the grooves or ducts 25 and 26 depends upon the relative rotary position of the sleeve and spool at any one time.

Figure 10:
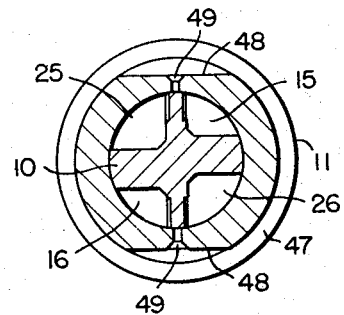

Assuming that the spool 10 has been rotated relative to the sleeve 11 from the neutral position shown in FIG. 10 clockwise to a position where the ports 49 register with the grooves 25 and 26, the fluid will flow from the grooves 25 and 26 through ports 49 to groove 47, through ducts 90 and 93 (FIG. 4) in the block 12, and line 96 to one side of the piston or other part whose motion is controlled by the valve. At the same time the fluid will be flowing from the other side of this piston or other part through line 97, duct 92, groove 50 and ports 52 in sleeve 11 to grooves 35 and 36 of spool 10, ports 45 (FIG. 8) in sleeve 11, groove 43 of the sleeve, ducts 85, 81 and 89 in housing 12 and line 91 to the sump, or exhaust side of the system. Thus, the piston or other controlled part will be moved in one direction.

As the spool rotates counterclockwise relative to the sleeve, or the sleeve is rotated clockwise relative to the spool, the ports 49 are closed to supply and opened to exhaust, and the ports 52 are put on supply. The motive fluid then flows from the line 72 (FIG. 3) through the ducts 73, 74, 75 in the housing 12, groove 64 (FIGS. 8 and 11) and ports 65 in the sleeve, grooves 30 and 31 (FIGS. 6, 7 and 11) in the spool, ports 52 and groove 50 in the sleeve, duct 92 in the housing, and line 97 to the opposite side of the piston or other valve-controlled part from that which has previously been on supply. Simultaneously the fluid exhausts from the opposite side of the piston through line 96, ducts 93 and 90 in housing 12, groove 47 and ports 49 in sleeve 11, grooves 15 and 16 and ports 44 in sleeve 11 (FIGS. 8 and 10), and ducts 84, 86 and 81 in housing 12 to the sump or exhaust side of the system. The piston or other controlled part will be moved therefore in the opposite direction. This completes a cycle of operation of the valve.

The motor, which drives the spool, may be a step motor; and the motor, which drives the sleeve responds to the relative positions of spool and sleeve; and the relative movements of spool and sleeve may be alternating step-by-step movements of the two, that is, alternate movements of sleeve and spool. Then the amount of movement of the sleeve relative to the spool, and vice versa, will determine the rate of flow of fluid in the system as a function of the system load, that is, the spool, in conjunction with the sleeve, may act not only as a control on the direction of movement but also on the speed of movement, that is, may act both as a directional control valve and a throttle valve.

The valve of this invention has a low torque rotary input. It will be closed in any selected input position by rotary feedback. Perfect relation is maintained between the input and feedback positions, thereby eliminating the possibility of a permanent phase shift between the spool and the sleeve, other than such phase shift as may be due to valve hysteresis. Radial unbalancing forces are eliminated as are, also, axial unbalancing forces. The diametrically opposite pressure grooves provided in the spool insure balance. Likewise, the diametrically opposite grooves provided in the spool for the return or the exhaust, and the diametrically opposite ports provided in the sleeve that communicate with opposite ends of the piston, or whatever device it is that is controlled by the valve, insure balance. A linear relation is maintained between either rotary input or feedback position and valve flow by means of the controlled port configuration 49-52 (FIG. 8).

The valve spool and sleeve combination controls the flow path from the supply line to the actuator and from the actuator to return. The spool and sleeve combination and their respective control lands and ports can attain any position in a rotary plane with respect to the supply, return and actuator ports, but are spaced in the axial direction of the spool and sleeve.

Each flow port ends in a separate peripheral groove and thus has full access to the spool and sleeve combination from any direction in a radial sense. Since flow control between pressure, return and actuator ports is provided by rotary motion only, the axially overlapping grooves are provided in the spool and are separated from the ducts in the housing by the sleeve. The sleeve provides access to the axial grooves in the spool through ports which are spaced axially to correspond with the radial grooves in the housing. The axial return cavities in the spool, as stated above, are so shaped as to provide torque compensation between the spool and sleeve of the Bernoulli forces acting in the pressure cavities which tend to open the valve.

The control ports in the sleeve may be tangentially located with respect to the axial center line of the spool, to compensate for hydrodynamic forces which create non-linearity of the control torque vs. control flow.

The servo motor 100 can be controlled with a stepped or with a continuous variable input signal.

With the present invention, a hydraulic motor can be added very simply to an existing hydraulic system. The motor and control valve may be integral with one another and require no additional hydraulic circuitry. All that is required to drive the motor is a low power input signal (20 to 200 watt depending on the application).

I claim:
1. A rotary control valve, comprising:
   a housing having a supply port through which a pressure fluid can be supplied, two exhaust ports through which fluid can be exhausted, and two other ports through which said fluid may be delivered to and from a part that is to be controlled by the valve,
   a sleeve rotatably mounted in said housing,
   a spool rotatable in said sleeve coaxially thereof and having in its periphery two diametrally opposed longitudinally extending supply grooves, said spool having two peripheral recesses which communicate with opposite ends, respectively, of each supply groove, the recesses at opposite ends of each supply groove being angularly offset from one another about the axis of said spool, and two pairs of diametrally-disposed, axially spaced exhaust grooves, the exhaust grooves of one pair being disposed in axial overlapping but angularly spaced relation, respectively, to one of said supply grooves at one end thereof and the exhaust grooves of the other pair being disposed in axial overlapping but angularly-spaced relation to the other supply groove at the opposite end thereof,
   said sleeve having an inlet port connecting said supply grooves to said supply port, outlet ports connecting said exhaust grooves to said exhaust ports, and two pairs of delivery ports, each pair of delivery ports being axially and angularly spaced from said inlet and outlet ports and communicating with one of said two other ports in said housing, and
   means connecting said spool and said sleeve for limited rotation relative to one another from a neutral position, selectively to a first operative position in which said supply grooves are connected to one pair of said delivery ports, and one pair of said exhaust grooves is connected to the other pair of said delivery ports, and to a second operative position in which said supply grooves are connected to said other pair of delivery ports, and the other pair of said exhaust grooves is connected to said one pair of delivery ports.

2. A rotary control valve as defined in claim 1, wherein:
   the recesses for each supply groove are angularly spaced 90° from each other about said axis of said spool by intervening peripheral lands, and
   the delivery ports of one pair are also angularly spaced 90° about the axis of said sleeve from the delivery ports of the other pair, and one pair of delivery ports is also axially spaced from one another.

3. A rotary control valve as defined in claim 2, wherein said delivery ports are substantially smaller in diameter than the remainder of said ports in said sleeve to provide torque compensation between said spool and said sleeve.

4. A rotary control valve as defined in claim 1, wherein said connecting means comprises:
   a pin secured in said spool and projecting from diametrically opposite sides thereof into registering arcuate slots formed in diametrally opposite sides of said sleeve,
   each of said slots extending circumferentially about the axis of said sleeve for a distance slightly greater than the diameter of said pin, whereby when opposite ends of said pin are disposed medially of the ends of said slots, said spool is in its neutral position,
   said slots permitting said spool to be rotated angularly in opposite directions, respectively, relative to said sleeve from its neutral position to its first and second operative positions, respectively.

5. A rotary control valve as defined in claim 1, including:
   means connecting said spool to the shaft of a first motor,
   means connecting said sleeve to the shaft of a second motor, one of said motors being synchronous, and the other of said motors being connected to the part, which is controlled by the valve,
   whereby when said shafts rotate at the same speed, said spool is maintained in its neutral position, and when the shaft of said other motor rotates at a speed different from that of said synchronous motor, said spool moves to one of its first and second operative positions to increase and decrease, respectively, the speed of said other motor depending on the difference in said speeds.

6. A rotary control valve, comprising:
   a housing having a supply port through which a pressure fluid can be supplied, two exhaust ports through which fluid can be exhausted, and two other ports for delivering fluid to and from a part that is to be controlled by the valve,
   a sleeve rotatably mounted in said housing and having an inlet port communicating with said supply port, a pair of axially spaced outlet ports comunicating with said exhaust ports, and a pair of axially spaced delivery ports communicating, respectively, with said two other ports,
   a spool rotatable in said sleeve coaxially thereof and having in its periphery an axially extending supply groove communicating with said inlet and supply ports, and a pair of axially and angularly spaced exhaust grooves disposed adjacent opposite ends, respectively of said supply groove, and communicating with said outlet and exhaust ports,
   one of said exhaust grooves and one end of said supply grooves being disposed in axial overlapping relation to one of said delivery ports, and the other of said exhaust grooves and the opposite end of said supply groove being disposed in axial overlapping relation to the other of said delivery ports, and
   means connecting said spool and said sleeve for limited rotation relative to one another from a neutral position, in which said spool closes said delivery ports, selectively to a first operative position in which said one exhaust groove communicates with said one delivery port and said other delivery port communicates with said supply groove, and a second operative position in which the other of said exhaust grooves communicates with said other delivery port and said supply groove communicates with said one delivery port.

7. A rotary control valve, comprising:

a housing, a sleeve rotatably mounted in said housing and having therein an inlet port, two outlet ports, and two delivery ports, said ports being spaced from one another axially of said sleeve, a spool rotatable in said sleeve and having two axially-extending supply grooves spaced angularly from one another about the axis of rotation of said spool and and communicating with said inlet port, and two exhaust grooves spaced axially from one another and from said supply grooves and communicating with said two outlet ports, respectively, said supply grooves being of sufficient axial extent to communicate selectively with one of said two delivery ports at different rotary positions of said spool, and one of said exhaust grooves being of sufficient axial extent to overlap and communicate with one of said two delivery ports and one of said outlet ports at one rotary position of said spool, and the other of said exhaust grooves being of sufficient axial extent to overlap and communicate with the other of said two delivery ports and the other of said two outlet ports at another rotary position of said spool, means in said housing for conducting a motive fluid to said inlet port, means in said housing for exhausting said fluid from said outlet ports, means in said housing for conducting the motive fluid from outside said housing to and from said delivery ports, and means for rotating said sleeve and said spool.

References Cited

UNITED STATES PATENTS

| 1,992,104 | 2/1935 | Theodorides | 137—614.17 XR |
| 2,219,406 | 10/1940 | White | 137—614.17 XR |
| 2,547,929 | 4/1951 | Dawson | 137—625.23 |
| 3,145,626 | 8/1964 | Vickers et al. | 137—625.24 XR |
| 3,199,539 | 8/1965 | Leathem | 137—625.43 XR |
| 3,213,881 | 10/1965 | Findlay et al. | 137—625.24 XR |

HENRY T. KLINKSIEK, *Primary Examiner.*

U.S. Cl. X.R.

137—625.23